(12) United States Patent
Granzow et al.

(10) Patent No.: US 12,528,420 B2
(45) Date of Patent: Jan. 20, 2026

(54) SENSOR DEVICE FOR FASTENING TO THE INSIDE OF A VEHICLE WINDOW

(71) Applicant: Continental Automotive Technologies GmbH, Hannover (DE)

(72) Inventors: Oliver Granzow, Villingen-Schwenningen (DE); Oliver Griese, Villingen-Schwenningen (DE); Werner Miethig, Brigachtal (DE); Marius Giuchici, Timisoara (RO); Paul Adrian Macovei, Timisoara (RO)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 96 days.

(21) Appl. No.: 18/073,116

(22) Filed: Dec. 1, 2022

(65) Prior Publication Data

US 2023/0166665 A1 Jun. 1, 2023

(30) Foreign Application Priority Data

Dec. 1, 2021 (DE) .......................... 102021213633.8

(51) Int. Cl.
*B60R 11/00* (2006.01)
*G01S 7/481* (2006.01)
(Continued)

(52) U.S. Cl.
CPC ....... *B60R 11/00* (2013.01); *B60R 2011/0026* (2013.01); *B60R 2011/0049* (2013.01);
(Continued)

(58) Field of Classification Search
CPC ............. B60R 11/00; B60R 2011/0026; B60R 2011/0049; G01S 17/931; G01S 7/4813; H04N 23/51
(Continued)

(56) References Cited

U.S. PATENT DOCUMENTS 3,291,179 A * 12/1966 Lang ...................... A45C 11/38
396/419
4,536,925 A * 8/1985 Boothe ...................... A45F 5/02
248/548
(Continued)

FOREIGN PATENT DOCUMENTS

CN 105128761 A 12/2015
CN 106199603 A 12/2016
(Continued)

OTHER PUBLICATIONS

Extended European Search Report mailed Apr. 20, 2023 from corresponding European patent application No. 22204051.1.
(Continued)

*Primary Examiner* — Peter N Helvey

(57) ABSTRACT

A sensor device for fastening to the inside of a vehicle window of a motor vehicle, comprising a holder that is connectable to the vehicle window, a carrier that is connected pivotably to the holder, and a sensor unit that is arranged on the carrier, the carrier being pivotable relative to the holder by a settable pivot angle about a carrier pivot axis, and the pivot angle being lockable by a fixing device is disclosed. For particularly precise pivotability of the carrier relative to the holder, the fixing device has a worm mechanism with a worm and with a worm wheel, the axis of rotation of the worm wheel corresponding to the carrier pivot axis.

11 Claims, 6 Drawing Sheets

(51) Int. Cl.
    *G01S 17/931* (2020.01)
    *H04N 23/51* (2023.01)
(52) U.S. Cl.
    CPC .......... *G01S 7/4813* (2013.01); *G01S 17/931* (2020.01); *H04N 23/51* (2023.01)
(58) Field of Classification Search
    USPC .......................................................... 224/482
    See application file for complete search history.

(56) References Cited

U.S. PATENT DOCUMENTS

| | | | |
|---|---|---|---|
| 6,170,955 | B1 | 1/2001 | Campbell et al. |
| 9,267,761 | B2 | 2/2016 | Stewart |
| 9,487,161 | B2* | 11/2016 | Rawlings ................ B60R 11/04 |
| 10,604,082 | B2* | 3/2020 | Fujiwara ................ B60R 11/04 |
| 10,682,965 | B2* | 6/2020 | Oba ........................ G01S 15/931 |
| 10,953,817 | B2* | 3/2021 | Karasik .................... B60R 11/04 |
| 10,974,650 | B2* | 4/2021 | Kremkow ................. B60R 1/12 |
| 11,040,663 | B2* | 6/2021 | DeMaagd .............. G02B 7/182 |
| 11,237,029 | B2* | 2/2022 | Kasai ...................... B60R 11/04 |
| 11,237,461 | B2* | 2/2022 | Kasai ...................... H04N 23/51 |
| 11,433,827 | B2* | 9/2022 | Singh ..................... B60R 11/04 |
| 11,460,754 | B2* | 10/2022 | Kasai .................... G03B 11/045 |
| 2011/0129209 | A1* | 6/2011 | Kortan .................. B60S 1/0881 396/419 |
| 2012/0169919 | A1 | 7/2012 | Huertos Sanz |
| 2012/0207461 | A1* | 8/2012 | Okuda .................... B60R 11/04 396/419 |
| 2015/0030319 | A1 | 1/2015 | Matori |
| 2017/0274835 | A1 | 9/2017 | Kasai et al. |
| 2018/0220049 | A1 | 8/2018 | Yamada et al. |

FOREIGN PATENT DOCUMENTS

| | | |
|---|---|---|
| CN | 206287928 U | 6/2017 |
| CN | 206812915 U | 12/2017 |
| CN | 108312979 A | 7/2018 |
| CN | 109151282 A | 1/2019 |
| CN | 109572582 A | 4/2019 |
| CN | 209112076 U | 7/2019 |
| CN | 110077333 A | 8/2019 |
| CN | 209505632 U | 10/2019 |
| CN | 214084098 U | 8/2021 |
| DE | 10162652 A1 | 7/2003 |
| DE | 102004042217 A1 | 3/2006 |
| DE | 102011116388 A1 | 4/2013 |
| DE | 102011118121 A1 | 5/2013 |
| DE | 112017006142 T5 | 8/2019 |
| DE | 102018005317 A1 | 1/2020 |
| DE | 102019215667 B3 | 11/2020 |
| EP | 2952388 A1 | 12/2015 |
| KR | 100661051 B1 | 12/2006 |
| KR | 20190138385 A | 12/2019 |
| WO | 2015088396 A1 | 6/2015 |
| WO | 2021112636 A1 | 6/2021 |

OTHER PUBLICATIONS

Office Action dated Aug. 31, 2022 from corresponding German patent application No. 10 2021 213 638.8.
Office Action dated Jun. 25, 2020 from related German patent application No. 10 2019 215 667.3.
International Search Report and Written Opinion dated Nov. 11, 2020 from related International patent application No. PCT/EP2020/078512.
Non-FInal Office Action dated Mar. 6, 2024 from related U.S. Appl. No. 17/767,628.

* cited by examiner

SENSOR DEVICE FOR FASTENING TO THE INSIDE OF A VEHICLE WINDOW

CROSS REFERENCE TO RELATED APPLICATIONS

This U.S. patent application claims the benefit of German patent application No. 10 2021 213 633.8, filed Dec. 1, 2021, which is hereby incorporated by reference.

TECHNICAL FIELD

The disclosure relates to a sensor device for fastening to the inside of a vehicle window of a motor vehicle, having a holder that is connectable to the vehicle window, having a carrier that is connected pivotably to the holder, and having a sensor unit that is arranged on the carrier, the carrier being pivotable relative to the holder by a settable pivot angle about a carrier pivot axis, and the pivot angle being lockable by a fixing device.

BACKGROUND

Modern motor vehicles, specifically both passenger motor vehicles and utility vehicles, generally have a large number of sensor devices. These include sensor devices that are arranged on a front window of the motor vehicle. The existence of many different types of vehicles, which have front windows with different window curvatures and/or window inclinations, means that, in order to correctly install the sensor device in a motor vehicle, it is necessary to provide housings that are adapted to the respective vehicle type in order to compensate for the different window curvatures and/or window inclinations.

In order to minimize the number of variants of such housings or of corresponding holders for the different types of vehicles, a sensor device as mentioned in the introduction is known in which the carrier is pivotable relative to the holder and the pivot angle is lockable by multiple fastening recesses, which are provided for use in an alternative manner. A disadvantage here is that, owing to the limited number of fastening recesses, the pivot angle is lockable only in one of a coarse set of predefined angles.

It is an object of the disclosure to create a sensor device of the type mentioned in the introduction that allows and ensures particularly precise pivotability of the carrier relative to the holder.

SUMMARY

Said object is achieved according to the disclosure in that the fixing device has a worm mechanism with a worm and with a worm wheel, the axis of rotation of the worm wheel corresponding to the carrier pivot axis.

The pivot angle may in principle be set in continuously variable fashion by the worm mechanism. The carrier, and with this the sensor unit, may be oriented on and relative to the motor vehicle in a particularly precise manner. This is particularly advantageous for sensor units with increasingly greater range because, with these, even the smallest changes in the pivot angle of the carrier relative to the holder may lead to significant deviations in the measurement results obtained by the sensor unit. Additionally, with a self-inhibiting design of the worm mechanism, reliable fixing and locking of the pivot angle is easily possible. In this way, locking of the pivot angle may be effected simply by way of a self-inhibiting action of the worm mechanism.

The vehicle window to which the sensor device according to the disclosure is attachable is in particular a windshield or front window of the motor vehicle; it is however also conceivable in principle for the sensor device to be provided for attachment to a rear window, or optionally to a side window, of the motor vehicle. Here, the sensor device is configured for fastening to the vehicle window, in particular windshield. In particular, an adhesive bond may be provided for the connection of vehicle window and sensor device, that is to say the holder is adhesively bondable to the vehicle window. For this purpose, the holder has a vehicle window connecting surface. The surface of the holder is then connected to the vehicle window, in particular adhesively bonded to the vehicle window.

The carrier of the sensor device is pivotable together with the sensor unit about the carrier pivot axis. The carrier pivot axis is oriented parallel to the vehicle window.

The worm mechanism of the fixing device may in principle be any worm mechanism, for example a spur-gear worm mechanism. The axis of rotation of the worm wheel of the worm mechanism corresponds to the carrier pivot axis, that is to say the pivot axis between carrier and holder.

With the sensor device according to the disclosure, it is made possible for the sensor unit arranged on the carrier to be pivoted and set relative to the holder, and thus also relative to the vehicle window and the vehicle when the sensor device is in the installed state in the motor vehicle, in particularly precise, in principle continuously variable fashion. In principle, and preferably, the pivot angle between carrier and holder is settable into any desired intermediate positions. Furthermore, the disclosure makes possible a particularly compact fixing device that requires only relatively little installation space, whereby the sensor device may be of altogether particularly installation-space-saving design. In general, any reduction of the installation space required for the sensor device contributes to an improvement in the visibility for a vehicle driver through the vehicle window, and thus additionally to a further increase in traffic safety.

The sensor device according to the disclosure allows easy adaptation to different types of vehicles. There is no need for a large number of different sensor device variants that are each adapted to a particular type of vehicle. In this way, both production costs and further costs, such as warehousing costs, are reduced. In particular in the utility vehicle sector, the variety of types of utility vehicles is particularly great, and the unit quantities of individual types of vehicles are in some cases very low. The sensor device according to the disclosure may be used inexpensively here, that is to say as a sensor device for fastening to the inside of a vehicle window of a motor vehicle that is a utility vehicle.

In summary, the disclosure makes it possible for sensor units to be fastened and adjusted to vehicle windows, in particular windshields, of a wide variety of different types. The windows may differ for example in terms of size and/or curvature and/or angle of inclination. A reduction of variants in a manufacturing context may be achieved with the sensor device according to the disclosure. This is associated with a considerable cost reduction, in particular in the case of low unit quantities, for the sensor device. Furthermore, a suitable sensor device is available for a new type of vehicle, for example, in a short time.

For a particularly stable mechanical design of the sensor device, in accordance with one embodiment of the disclosure, the worm is arranged on the holder and the worm wheel is arranged on the carrier. The worm is arranged in a positionally fixed manner on the holder, and the worm wheel is in particular arranged rigidly on the carrier.

In another embodiment of the disclosure, the worm wheel is formed integrally with the carrier. In this way, the construction of the sensor device may be further simplified, and the number of components may be reduced. The fact that the worm wheel is formed integrally with the carrier means that worm wheel and carrier are configured as one piece, forming a single component. For example, carrier and worm wheel may form a single plastics injection-molded component.

The weight and the required installation space of the sensor device are additionally reduced if, in accordance with another embodiment of the disclosure, the worm wheel is configured as a worm wheel segment. Here, the worm wheel is formed not as a complete circle but as a circular sector, also referred to as a circular segment.

In another embodiment of the disclosure, the holder has a mounting arrangement with a first mounting point, which is formed by a first receptacle, and with a second mounting point, which is formed by a second receptacle, the worm being mounted rotatably in the mounting arrangement. The two mounting points thus define a mounting axis that corresponds to the worm axis of the worm. A permanently exact mounting arrangement for the worm is provided by the two mounting points of the holder.

In another embodiment of the disclosure, the worm is arranged perpendicular to a vehicle window connecting surface of the holder. Thus, when the sensor device is in an installed state in the motor vehicle, the worm is also arranged perpendicular to the vehicle window. The perpendicular arrangement of the worm not only achieves a reliable construction of the sensor device but also allows particularly easy access to the worm for setting of the pivot angle of the carrier relative to the holder.

In particular, in order to permanently ensure a set pivot angle between carrier and holder even during later operation of the sensor device in its installed state in the motor vehicle, in accordance with one embodiment of the disclosure, a detent device for radially fixing the worm is arranged between holder and worm. The radial fixing of the worm means the rotational fixing thereof in relation to the pivot axis, and secures the worm against unintended rotation in a particularly reliable manner.

In accordance with one embodiment of the disclosure, the detent device has a detent spring, which is arranged on the holder, and multiple detent elements, which are arranged on the worm radially around the pivot axis. The detent spring may be configured as one piece with the holder, forming a single component. The detent elements may for example be detent recesses or detent cams.

A detent device of particularly simple and reliable construction is obtained if, in accordance with one embodiment of the disclosure, the detent elements, that is to say for example the detent recesses or detent cams, are aligned axially on the worm, and if the detent spring and at least one of the detent elements engage with one another for the purposes of radially fixing the worm.

In accordance with another embodiment of the disclosure, a holding spring for axially locating the worm is arranged on the holder, holding spring and worm being arranged relative to one another such that the holding spring subjects the worm to an axial force that causes the worm to bear against an axial stop. The axial stop may for example be a constituent part of the first or of the second mounting point, or may be formed on one of said mounting points. The axial force that is exerted on the worm by the holding spring thus acts in the direction of the worm axis of the worm.

For easy installation and possible exchangeability of the sensor device on the carrier, in accordance with another embodiment of the disclosure, the carrier has two fastening clips, the fastening clips holding the sensor unit detachably on the carrier. In particular, for a stable arrangement, the fastening clips hold the sensor unit laterally on the carrier. The fastening clips are metal components, and the carrier is a plastics component, in particular a plastics injection-molded component.

In principle, it is for example conceivable for the sensor unit to have a sensor based on acoustic waves, for example an ultrasound sensor, or based on electromagnetic waves, for example a radar sensor. By contrast, with regard to the interaction of the sensor device with the further components of carrier, holder and worm mechanism of the sensor device, in accordance with one embodiment of the disclosure, the sensor unit has an optical sensor. The optical sensor may in particular be a camera, though a lidar sensor, for example, is also conceivable.

BRIEF DESCRIPTION OF THE DRAWINGS

Embodiments of the disclosure are illustrated diagrammatically and schematically in the drawing and will be described in more detail below.

DETAILED DESCRIPTION

In all of the figures, respectively corresponding elements are denoted by the same reference designations.

Figure 1:
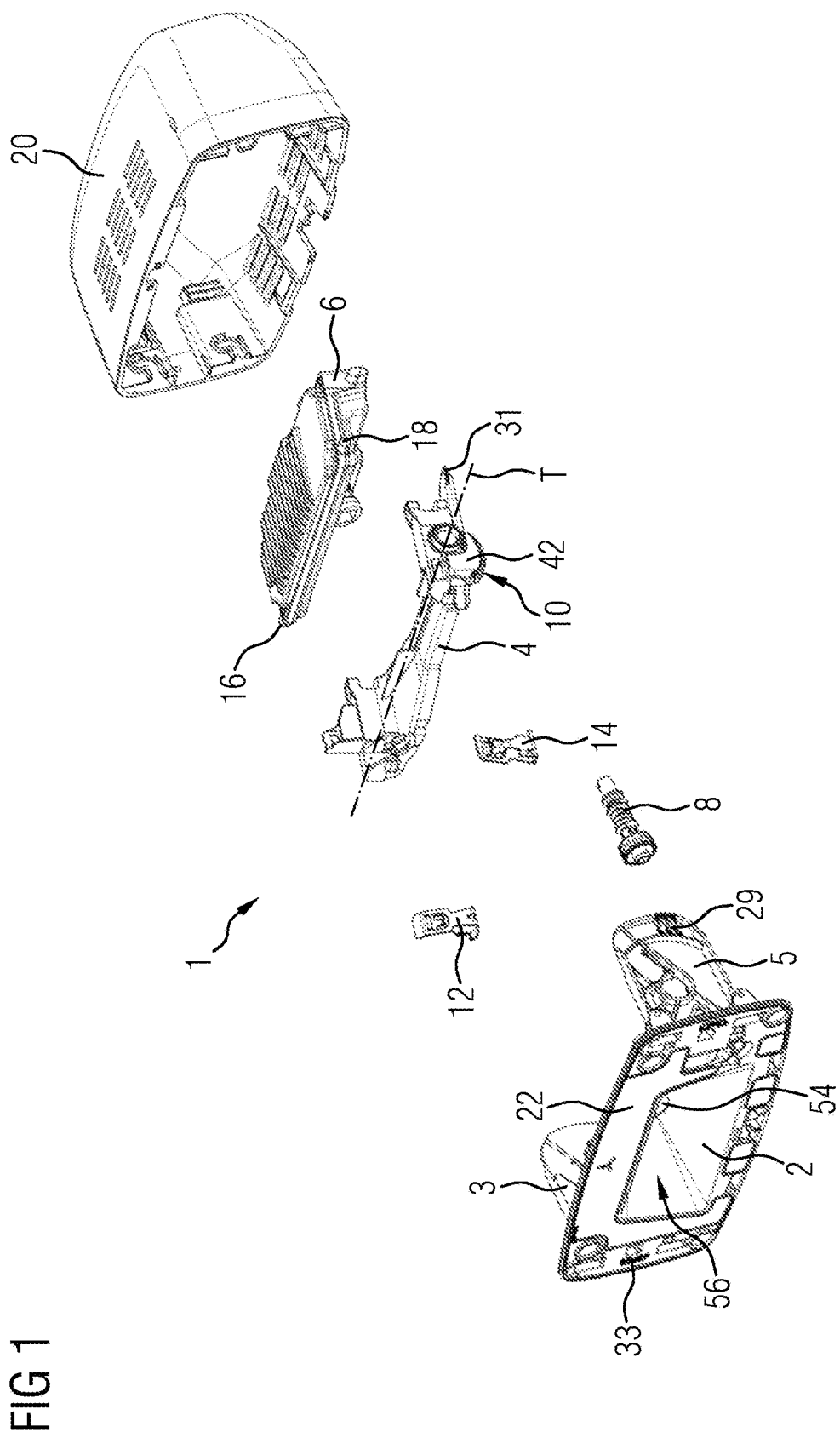
FIG. 1 shows a sensor device in an exploded illustration.

FIG. 1 shows, in an exploded illustration, a sensor device 1 for fastening to the inside of a vehicle window (not illustrated here) of a motor vehicle. The sensor device 1 has a holder 2, which is connectable to the vehicle window, and a carrier 4, which is connected pivotably to the holder 2. The carrier 4 is arranged between, and mounted in, two side arms 3, 5 of the holder 2. A sensor unit 6 is arranged on the carrier 4.

The carrier 4 is pivotable relative to the holder 2 by a settable pivot angle about a carrier pivot axis T. The pivot angle is lockable by a fixing device. The fixing device has a worm mechanism with a worm 8 and with a worm wheel 10. The axis of rotation of the worm wheel 10 corresponds to the carrier pivot axis T. The locking of the pivot angle may be implemented for example by way of a self-inhibiting action of the worm mechanism.

Furthermore, FIG. 1 shows two fastening clips 12, 14 of the carrier 4, by which the sensor unit 6 is held laterally on the carrier 4 in a detachable manner. For this purpose, lateral pegs 16, 18 of the sensor unit 6 engage with a respective one of the fastening clips 12, 14. The sensor device 1 furthermore has a housing 20, which protects in particular the sensor unit 6 and the worm mechanism.

A vehicle window connecting surface 22 of the holder 2 serves for a connection, for example by adhesive bonding, of sensor device 1 and vehicle window. The sensor device 1 is closed off to the outside by the vehicle window connecting surface 22 of the holder 2 and by the housing 20.

The holder 2 is for example directly adhesively bonded to the vehicle window. The carrier 4 may be connected at different angles to the holder 2. The worm 8 together with the worm wheel 10 provides settability of the connection between holder 2 and carrier 4. The sensor unit 6 is clipped into the carrier 4. The fastening clips 12, 14 hold the sensor unit 6 and the carrier 4 together. The housing 20 is clipped onto the holder 2 and encloses the sensor unit 6 and—with the exception of the vehicle window connecting surface 22—the holder 2.

Figure 2:
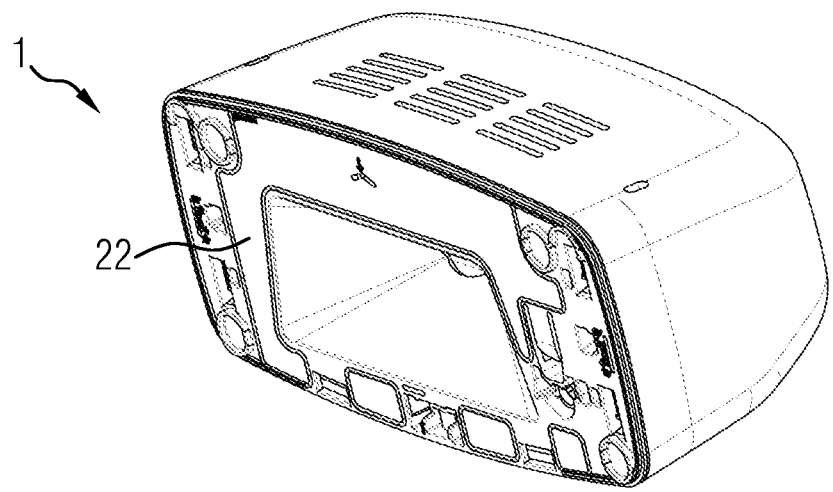
FIG. 2 shows the sensor device according to FIG. 1 in an assembled state and in a perspective view.

An overall view of the assembled sensor device 1 is illustrated in FIG. 2.

Figure 3:
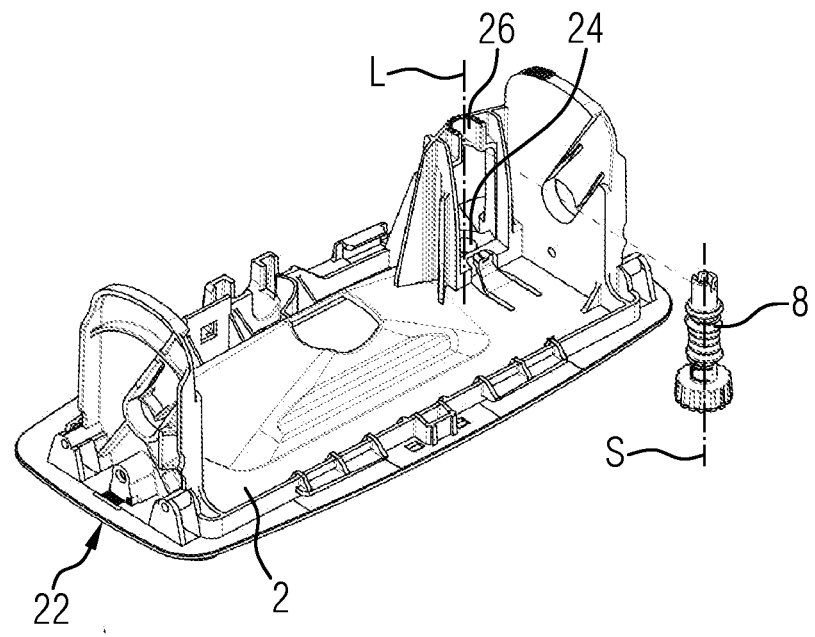
FIG. 3 shows a holder and a worm of the sensor device according to FIG. 1.
Figure 4:
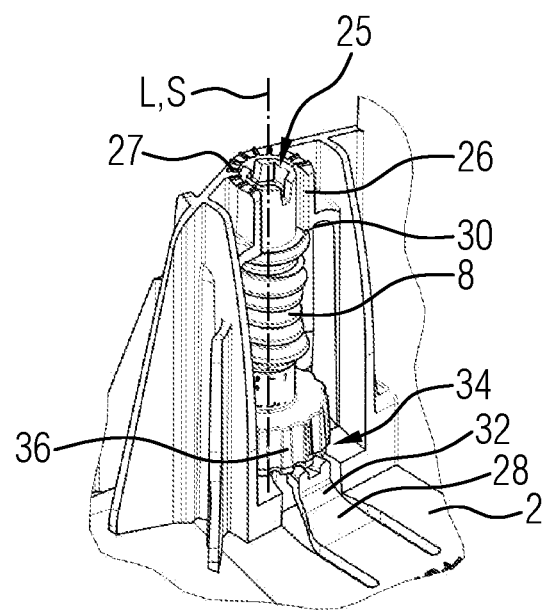
FIG. 4 shows a detail of the holder according to FIG. 3 with the worm.

FIGS. 3 and 4 show the holder 2 with the worm 8, the worm 8 being shown adjacent to the holder 2, in an uninstalled state, in FIG. 3 in order to make the design of the holder 2 more clearly visible. The holder 2 has a mounting arrangement with a first mounting point 24, which is formed by a first receptacle, and with a second mounting point 26, which is formed by a second receptacle. The worm 8 is mounted rotatably in the mounting arrangement. The mounting axis L of the mounting arrangement corresponds to the worm axis S. The worm 8 is arranged approximately perpendicular to the vehicle window connecting surface 22 of the holder 2.

At its end remote from the vehicle window connecting surface 22, the worm 8 has a tool engagement contour 25 on the end face. The second mounting point 26, which corresponds with said end of the worm 8, is equipped with a scale 27. Using a tool that is engaged with the tool engagement contour 25, the worm 8 may be easily rotated, and the pivot angle of the carrier 4 relative to the holder 2 may thus be easily changed. The scale 27 allows exact setting of the pivot angle. An additional angle scale 29 on one of the side arms 3, 5 of the holder 2, together with a corresponding pointer 31 arranged on the carrier 4, makes it possible for the set pivot angle to be easily read off. A further angle scale 33 on the vehicle window connecting surface 22 also allows the set pivot angle to be read off.

The worm 8 may also, at its other end facing toward the vehicle window connecting surface 22, have a tool engagement contour corresponding to the tool engagement contour 25 that has been described. It is then for example possible for a tool to be engaged with said tool engagement contour, for the purposes of rotating the worm 8, through a recess in the vehicle window connecting surface 22. Said two tool engagement surfaces may also be configured differently, such that different types of tools may be used for rotating the worm 8, for example.

A holding spring 28 for axially locating the worm 8 may be arranged on the holder 2. The holding spring 28 and the worm 8 are arranged relative to one another such that the holding spring 28 subjects the worm 8 to an axial force that causes the worm 8 to bear against an axial stop 30. In this embodiment, the axial stop 30 is a constituent part of the second mounting point 26.

At the same time, in the embodiment shown here, the holding spring 28 is also configured as a detent spring 32 of a detent device 34 that is arranged between holder 2 and worm 8 for the purposes of radially fixing the worm 8. The detent device 34 furthermore has multiple detent elements 36 that are arranged on the worm 8 radially around the pivot axis S. In the embodiment shown here, the detent elements 36 are configured as detent recesses. The detent elements 36 are aligned axially with the worm 8, and the detent spring 32 and two of the detent elements 36 engage with one another for the purposes of radially fixing the worm 8.

Figure 10:
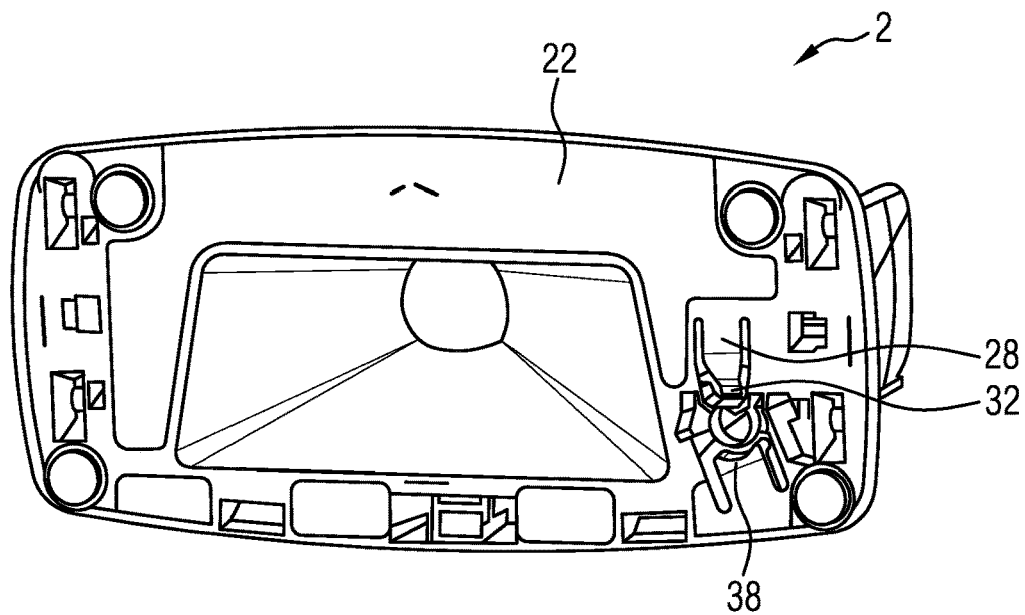
FIG. 10 shows a holder of a further sensor device in a front view.
Figure 11:
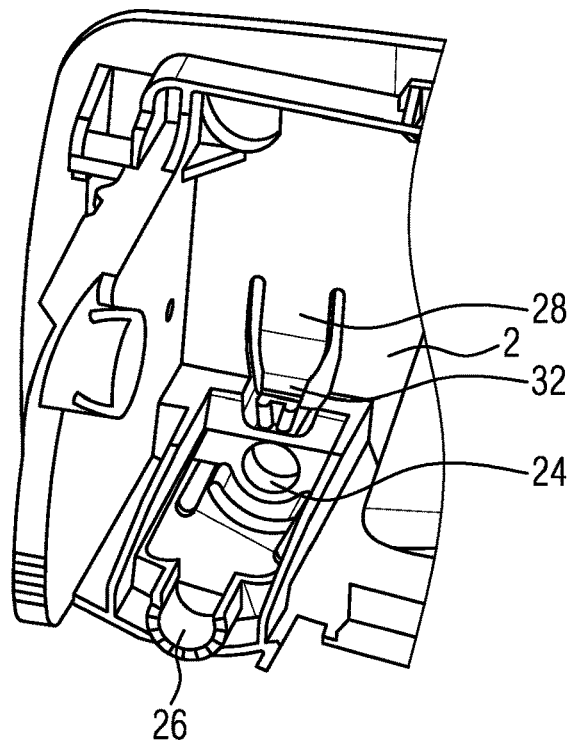
FIG. 11 shows a detail of the holder according to FIG. 10 in a rear view.

An alternative design of a holder 2 is shown in FIGS. 10 and 11. Here, in addition to a holding spring 28, which is at the same time configured as a detent spring 32 in this exemplary embodiment, too, a further spring 38 is additionally arranged on the holder 2. Said spring 38 additionally pushes the worm 8—not illustrated in FIGS. 10 and 11—into an end position in order to realize a play-free mounting arrangement.

Figure 5:
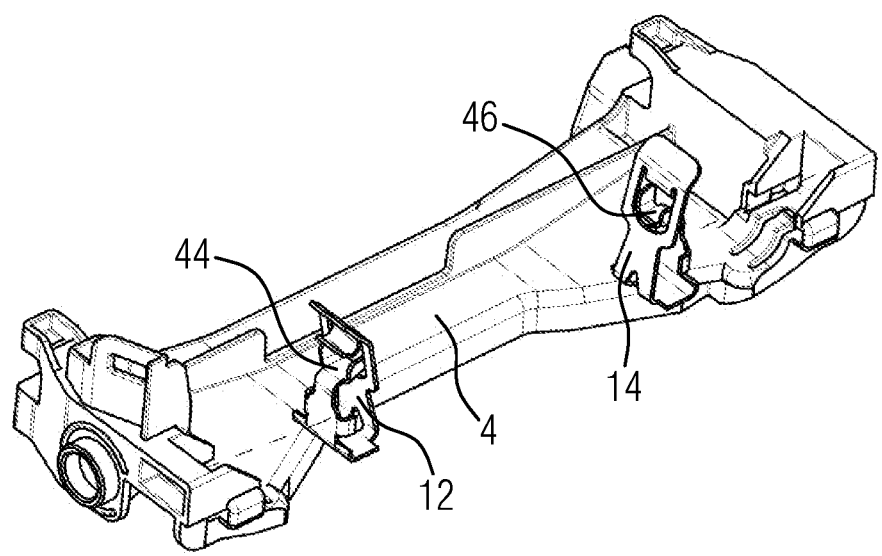
FIG. 5 shows a carrier the sensor device according to FIG. 1.
Figure 6:
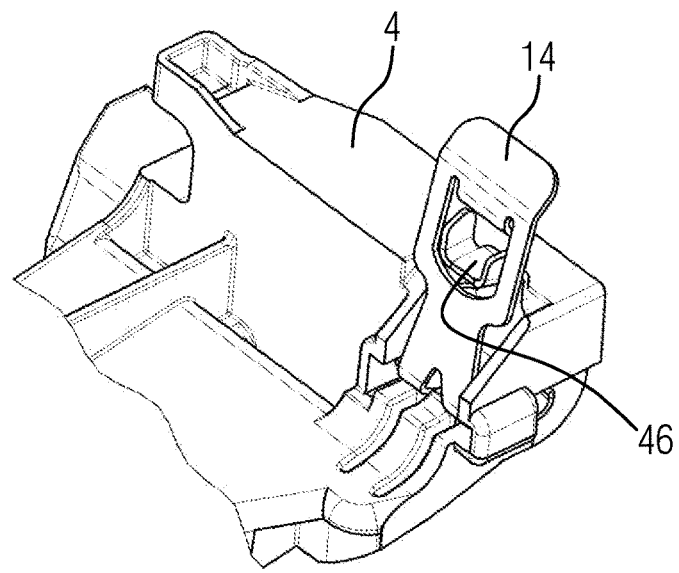
FIG. 6 shows a detail of the carrier according to FIG. 5 in an enlarged view.

The worm 8 is arranged in a positionally fixed manner on the holder 2, and the worm wheel 10 is arranged rigidly on the carrier 4 (cf. FIGS. 4 and 1). The worm wheel 10 is configured as a worm wheel segment 42 and is formed integrally with the carrier 4. The carrier 4 furthermore has the fastening clips 12, 14 (cf. FIGS. 5 and 6). For connection to the pegs 16, 18 of the sensor unit 6, the fastening clips 12, 14 are provided with receptacles 44, 46 that correspond with the pegs 16, 18.

Figure 7:
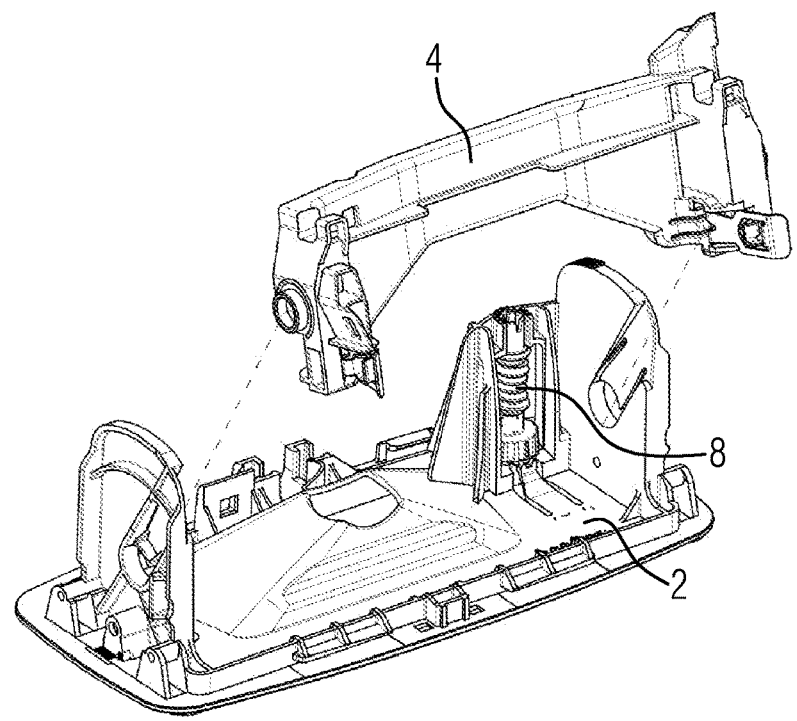
FIG. 7 shows the holder with the worm and the carrier of the sensor device according to FIG. 1.
Figure 8:
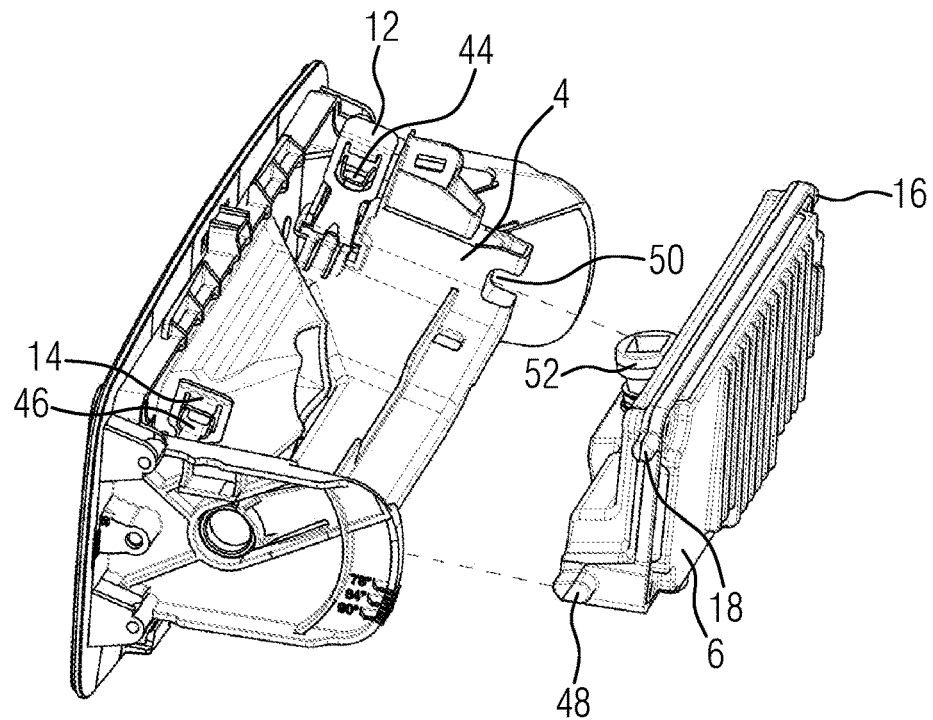
FIG. 8 shows the holder, the carrier and a sensor unit of the sensor device according to FIG. 1.
Figure 9:
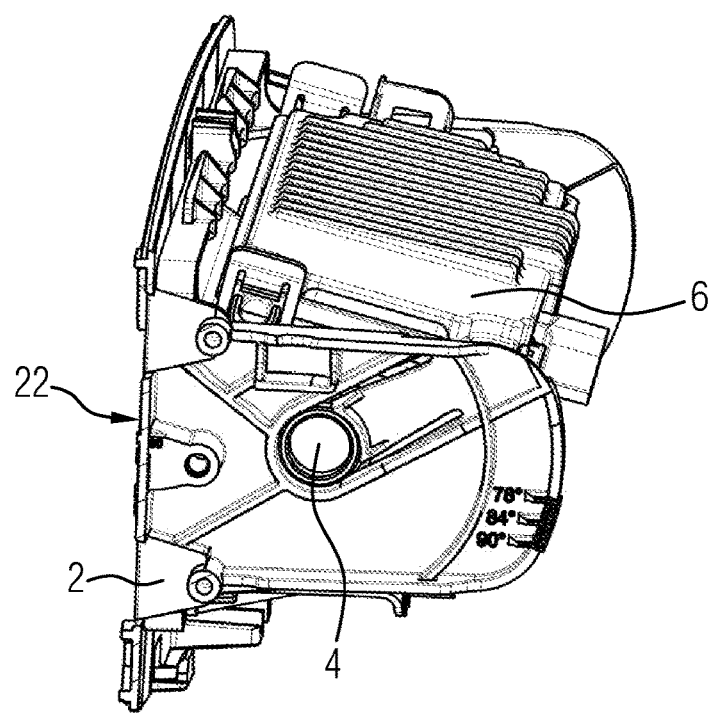
FIG. 9 shows the holder, the carrier and the sensor unit of the sensor device according to FIG. 1 in an assembled state.

FIG. 7 illustrates how, during the assembly of the sensor device 1, the carrier 4 is connected to the holder 2. After the carrier 4 and holder 2 have been connected, the sensor unit 6 is inserted into the carrier 4 and connected thereto, as indicated by FIG. 8. For this purpose, lateral tilting pegs 48 of the sensor unit 6 are firstly inserted into corresponding tilting receptacles 50 of the carrier 4. The sensor unit 6 is subsequently tilted relative to the carrier 4 until the pegs 16, 18 of the sensor unit 6 snap into the receptacles 44, 46 of the fastening clips 12, 14. A fully assembled unit composed of holder 2, carrier 4 and sensor unit 6 is illustrated in FIG. 9.

In the exemplary embodiment shown here, the sensor unit 6 has an optical sensor 52 (cf. FIG. 8), which is configured as a camera. When the sensor device 1 is in the assembled state, the optical sensor 52 is arranged in the region of an opening 54 (cf. FIG. 1) of the holder 2. Proceeding from the opening 54, the holder 2 is configured as a funnel 56 in the direction of the vehicle window connecting surface 22 and thus also in the direction of the vehicle window. The surface of the funnel 56 is configured to exhibit low reflectivity, for example owing to a corresponding surface treatment of the holder 2 in the region of the funnel 56. The funnel 56 thus protects the sensor unit 6, in particular the optical sensor 52 in this embodiment, against scattered light, and thus ensures interference-free functioning of the sensor unit 6.

Altogether, the disclosure presents how precise pivotability and fixing of a carrier, which has a sensor unit, of the sensor device relative to a holder, which is attachable to a vehicle window of a motor vehicle, of the sensor device is achieved whilst providing a stable and compact construction of a sensor device.

For example, there is a requirement for the optical axis of a sensor unit configured as a multifunction camera to be oriented exactly horizontally. In order to be able to realize this in different types of vehicles, the described sensor device provides a flexible holder solution. The sensor device is constructed such that it may be quickly and easily adapted to a respective type of vehicle, for example by an end customer. It is thus made possible for different types of vehicles to be covered, and for the number of variants to be minimized.

The invention claimed is:

1. A sensor device for fastening to the inside of a vehicle window of a motor vehicle, comprising:
   a holder that is adhesively bonded to the vehicle window, wherein the holder comprises a first side arm and a second side arm;
   a carrier that is connected pivotably to the holder, wherein the carrier is arranged between and mounted in the first side arm and the second side arm of the holder; and
   a sensor unit that is arranged on the carrier,
   wherein the carrier is pivotable relative to the holder by a settable pivot angle about a carrier pivot axis, and the pivot angle being lockable by a fixing device, and
   wherein the fixing device has a worm mechanism with a worm and with a worm wheel, the axis of rotation of the worm wheel corresponding to the carrier pivot axis, wherein a detent device for radially fixing the worm is arranged between the holder and the worm for rotational fixing in relation to the worm axis.

2. The sensor device as claimed in claim 1, wherein the worm is arranged on the holder and the worm wheel is arranged on the carrier.

3. The sensor device as claimed in claim 1, wherein the worm wheel is formed integrally with the carrier.

4. The sensor device as claimed in claim 1, wherein the worm wheel is configured as a worm wheel segment.

5. The sensor device as claimed in claim 1, wherein the holder has a mounting arrangement with a first mounting point, which is formed by a first receptacle, and with a second mounting point, which is formed by a second receptacle, the worm being mounted rotatably in the mounting arrangement.

6. The sensor device as claimed in claim 1, wherein the worm is arranged perpendicular to a vehicle window connecting surface of the holder.

7. The sensor device as claimed in claim 1, wherein the detent device has a detent spring, which is arranged on the holder, and multiple detent elements, which are arranged on the worm radially around the pivot axis.

8. The sensor device as claimed in claim 7, wherein the detent elements are aligned axially on the worm, and wherein the detent spring and at least one of the detent elements engage with one another for the purposes of radially fixing the worm.

9. The sensor device as claimed in claim 1, wherein a holding spring for axially locating the worm is arranged on the holder, holding spring and worm being arranged relative to one another such that the holding spring subjects the worm to an axial force that causes the worm to bear against an axial stop.

10. The sensor device as claimed in claim 1, wherein the carrier has two fastening clips, the fastening clips holding the sensor unit detachably on the carrier.

11. The sensor device as claimed in claim 1, wherein the sensor unit has an optical sensor.

* * * * *